United States Patent [19]

Sprandel

[11] 4,155,173
[45] May 22, 1979

[54] MOUNTING FOR COORDINATE MEASURING MACHINE ARMS AND PROBES

[76] Inventor: Hans W. Sprandel, 7595 Mariner Dr., Maple Grove, Minn. 55369

[21] Appl. No.: 796,748

[22] Filed: May 13, 1977

[51] Int. Cl.² .................. G01B 5/00; G01B 7/00
[52] U.S. Cl. .................. 33/174 L; 33/1 M; 33/DIG. 2; 308/DIG. 1
[58] Field of Search .............. 33/1 M, 172 E, 174 R, 33/174 L, 174 PC, DIG. 2; 308/5 R, DIG. 1

[56] References Cited

U.S. PATENT DOCUMENTS

| | | | |
|---|---|---|---|
| 3,231,319 | 1/1966 | Porath | 33/DIG. 2 |
| 3,384,970 | 5/1968 | Avalear | 33/DIG. 2 |
| 3,434,218 | 3/1969 | Potter | 33/1 M |
| 3,624,910 | 12/1971 | Farrand | 33/1 M |
| 3,757,423 | 9/1973 | Wieg | 33/174 R |
| 3,774,311 | 11/1973 | Stemple | 33/174 R |
| 3,813,789 | 6/1974 | Shelton | 33/DIG. 2 |
| 3,831,283 | 8/1974 | Pagella et al. | 33/174 R |

Primary Examiner—Richard R. Stearns
Attorney, Agent, or Firm—Nickolas E. Westman

[57] ABSTRACT

The present invention relates to coordinate measuring machines which are used for determining the location of a point in the X, Y and Z axes in order to permit inspection, checking, or performing other operations on work pieces. The measuring machine includes a probe for engaging the work piece and providing position information of points on the work piece. The probe is mounted on a cantilever arm that is supported on two parallel dual granite ways or rails through air film bearings. The probe is counterbalanced in a unique manner with an air cylinder and is also mounted on air bearings on its cantilevered support arm, and the probe may be rotated 360° for maximum flexibility and ease of operation.

16 Claims, 9 Drawing Figures

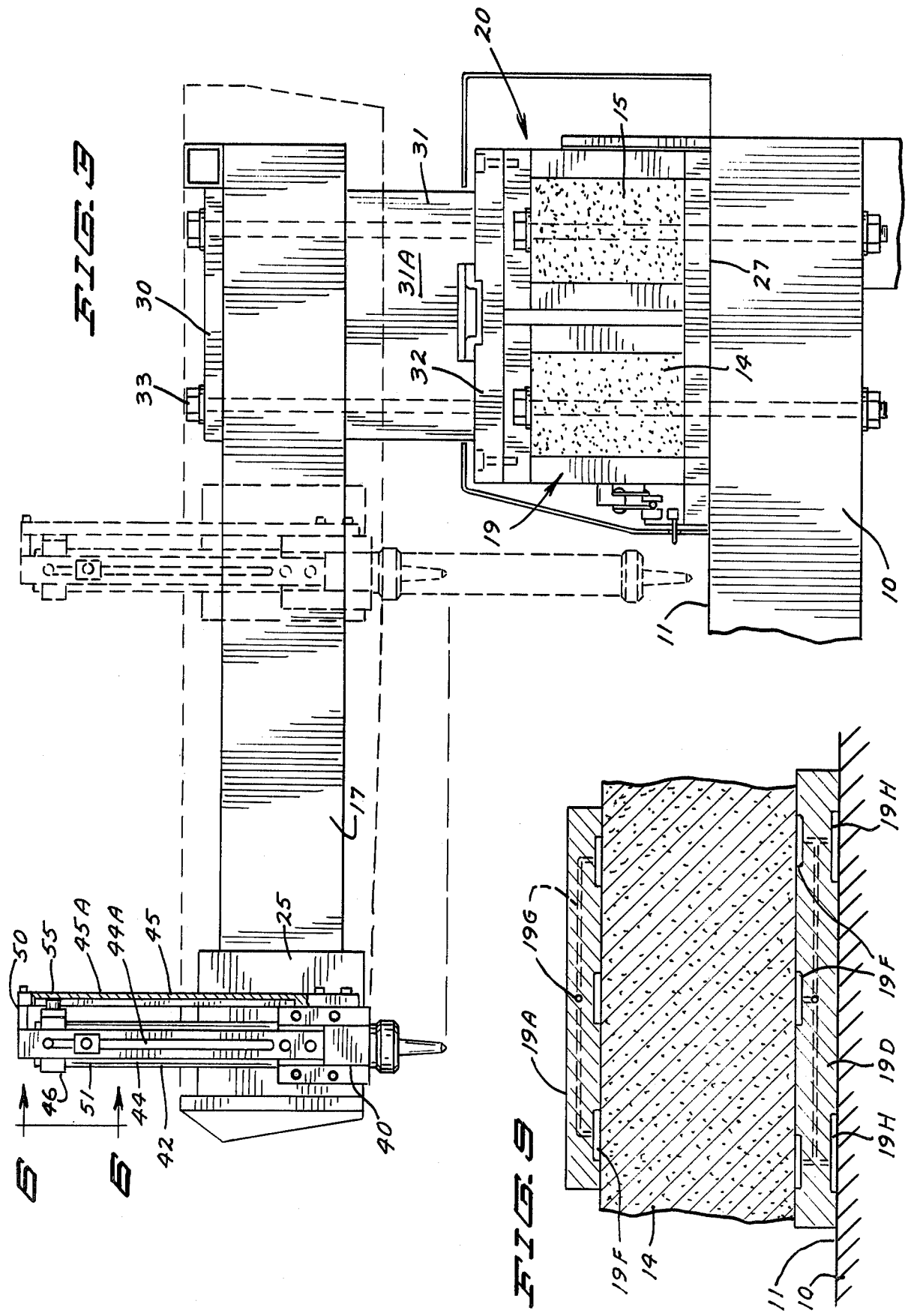

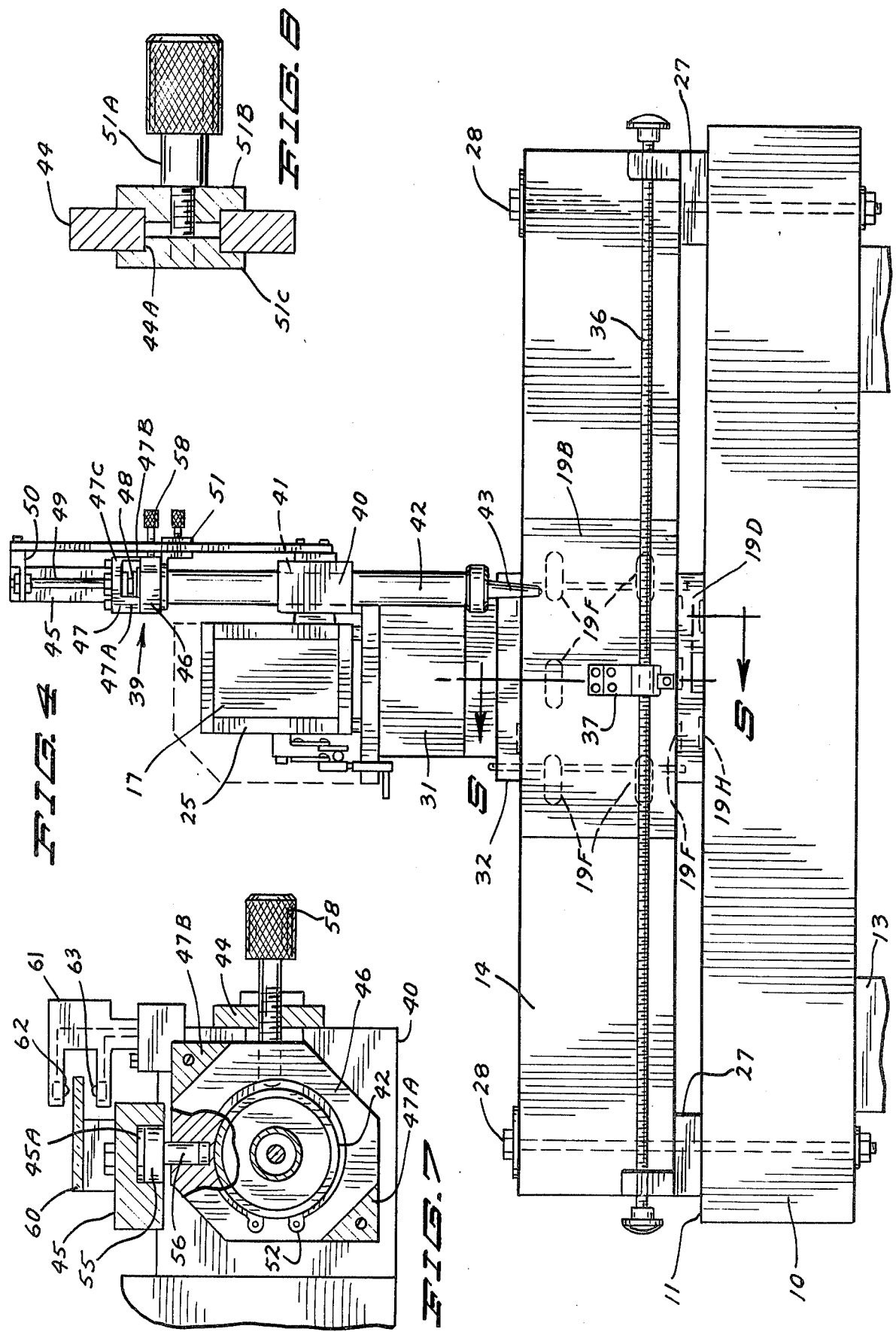

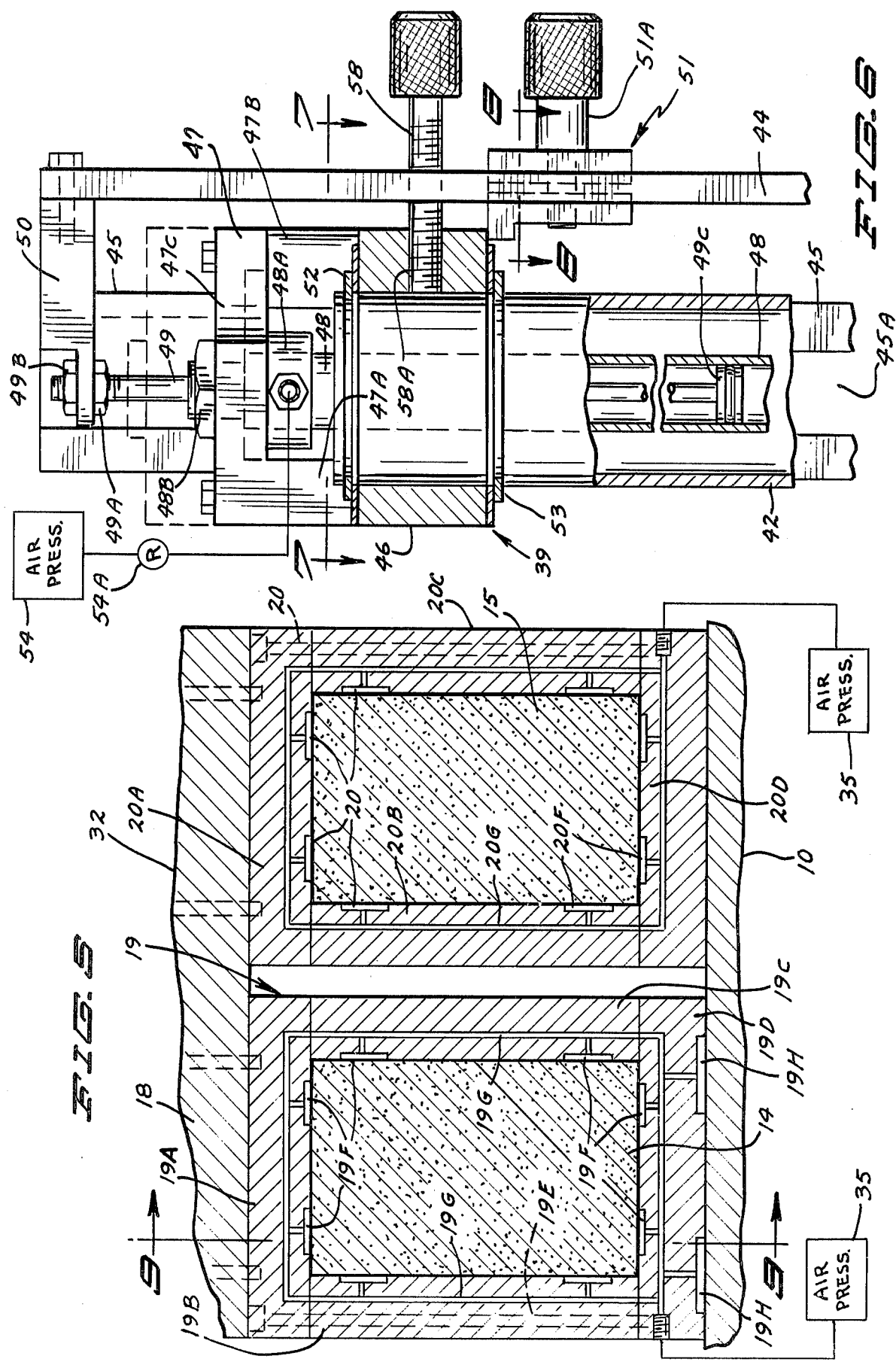

MOUNTING FOR COORDINATE MEASURING MACHINE ARMS AND PROBES

BACKGROUND OF THE INVENTION

1. Field of the Invention

The present invention relates to coordinate measuring machines which permit determining the location of any desired point on a work piece relative to three mutually perpendicular coordinate axes.

2. Prior Art

In the prior art coordinate measuring machines have been known which utilize probes which are supported on a cantilever arm, and which arms in turn are mounted onto a single granite cross support way or rail. Air film bearing supports are used in such machines and thus are not new. Various uses of air bearings have been advanced over the years.

A typical prior art coordinate measuring machine utilizes a work table having a flat surface, and a rectangular cross section granite rail or way extends across the width of the table surface near the back of the table. This way is mounted securely to the table, and on the way is mounted a support assembly comprising a box surrounding the granite way and supported with respect to the way during use on an air bearing. The support therefore can move transverse to the table along the rail or way in what can be termed the X axis of measurement. This support in turn has a cantilevered arm extending perpendicular to the granite way, and the arm also is made of granite and is generally of rectilinear cross section. A probe support or sleeve mounts over the cantilevered granite arm and is supported with respect to the arm on air bearings for movement along the axis of the arm which is at right angles to the axis of the main support way. This gives movement in the "Y" axis. A probe is mounted to the support on the arm and is movable in a vertical axis with respect to the table surface, or in other words perpendicular to the table surface, and this gives the Z axis movement.

In the prior art X, Y and Z axis measurements have used digital readouts. Generally speaking a digital readout from a reference point is provided, and suitable electro-optical sensors are utilized to provide a pulse each time the respective support moves along its respective axes an increment from the reference point. By suitable digital control equipment, the position of the probe itself can therefore be determined at any given point in all three axes of measurement.

By placing a work piece on the table surface, and identifying a reference point on the work piece, the work piece can be checked for dimensional accuracy; it can be checked to determine that particular features such as a hole are in the exact desired position; and generally the coordinate measuring machine can be used for rapid checking of the position of any point on the work area of the table or on a work piece on the table.

SUMMARY OF THE INVENTION

The present invention relates to a support for a coordinate measuring machine arm which comprises a pair of generally parallel spaced granite ways, or rails, each of which is surrounded by a box-like bearing supported on an air film relative to its respective way, and which bearings are connected together with a structure that supports a cantilevered arm of granite. The ways are mounted on a support table and the arm is in turn positioned at right angles to the parallel ways and above the table work area. An air bearing is mounted for movement along the arm. The arm supported bearing also supports a probe (on air bearings) that is movable in a vertical direction relative to the support table on which the ways are mounted.

In the device of the present invention, the parallel ways which extend in direction along the X axis of measurement on the support table provide rigidity and stability that is not achieved with only one way or rail and further, by providing an air film between the lower surface of the movable bearing that slides on the way adjacent the work area of the table and the table upper surface, the tendency of the cantilever arm to shift is greatly reduced, and the stiffness of the system, which is highly important to provide repeatability, is greatly enhanced.

In the form shown, the probe mounting permits the probe itself to be rotated 360° for simplified operation and more flexibility, particularly if differing types of probe tips are used and rotational coordinates are obtained from the rotating probe. Yet, the probe itself is very stable, rigid, and does not have any tendency to cock or bind during use. The probe is counterbalanced in the vertical direction by an air cylinder arrangement which will be more fully explained, and the amount of counterbalance force can be adjusted readily by regulating the air pressure to the cylinder to provide for substantially effortless operation.

BRIEF DESCRIPTION OF THE DRAWINGS

FIG. 3 is a side view of the machine of FIG. 2 with parts in section and parts broken away;

FIG. 4 is a front view of the machine of FIG. 2;

FIG. 5 is a sectional view generally taken along line 5—5 in FIG. 4;

FIG. 6 is a fragmentary enlarged view showing a counterbalance cylinder attachment to the probe of the machine of FIG. 2;

FIG. 7 is a sectional view taken generally along line 7—7 in FIG. 6;

FIG. 8 is a sectional view taken along line 8—8 in FIG. 6; and

FIG. 9 is a sectional view taken along line 9—9 in FIG. 5.

DESCRIPTION OF THE PREFERRED EMBODIMENTS

Figure 1:
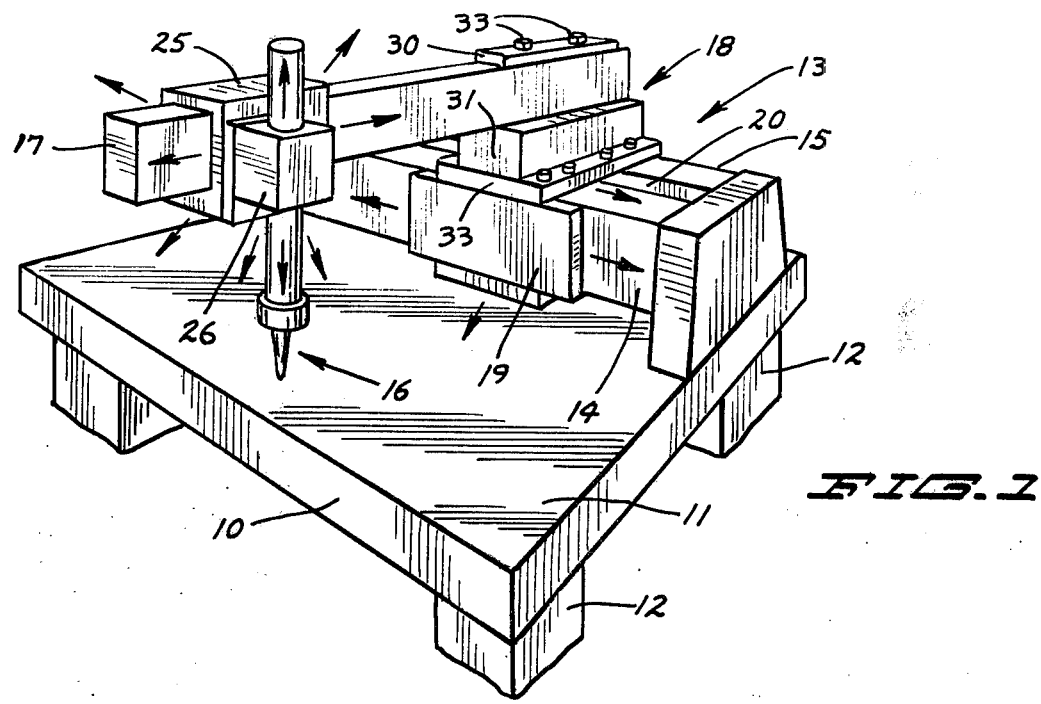
FIG. 1 is a schematic perspective view of a work table having a coordinate measuring machine assembly.

The schematic representation of a coordinate measuring machine shown in FIG. 1 includes a table 10 having a flat surface 11 and supported on suitable support legs 12. The table 10 is normally a slab of granite, that has a lapped top surface, made flat to within ±0.0001 inch, and which has the large open work area surface on which a work piece can be placed when it is to be checked or measured with the coordinate measuring machine indicated generally at 13. The coordinate measuring machine 13 is mounted on a pair of granite rails or ways 14 and 15, respectively which are adjacent each other. The way 14 is closest to the work area surface, and thus closest to the position where the work piece is placed. The ways 14 and 15 are closely spaced and are parallel to each other. The longitudinal axes of the ways 14 and 15 form the "X" direction of movement of the probe assembly which is indicated generally at 16. The probe assembly in turn is mounted onto a cantilevered granite arm 17 that is fixed through a suitable support mechanism indicated at 18 with respect to a pair of air bearings indicated generally at 19 and 20, each of which air bearings is mounted for sliding movement along its respective way 14 and 15. The axis of the arm 17 is perpendicular to the axes of the ways 14 and 15. The probe 16 is mounted with a suitable bearing block 25 (shown only schematically in FIG. 1) which moves axially along the arm 17. Movement along the arm 17 comprises the "Y" axis movement for the coordinate measuring machine.

The arm 17 is rigidly mounted through the support member 18 to both bearings 19 and 20, and is held stiffly with respect to the surface 11. The arm 17 remains at a known position, substantially parallel to the table reference surface 11. The probe 16 in turn is mounted in a suitable support block which is shown only schematically at 26 in FIG. 1. Support block 26 is carried by the bearing block or member 25. The probe can move up and down in support block 26 perpendicular to the surface 11. This movement provides the "Z" axis movement for the coordinate measuring machine relative to surface 11.

The bearings 19, 20, 25 and 26 are all air bearings and permit the movement of the respective bearing housings on a film of air with respect to the associated arm or ways, and with respect to the probe so that the movement does not cause any wear. The movable parts are not in contact and thus ease of movement is achieved.

The air bearings are conventionally used, and air under pressure is supplied in a suitable manner to the bearing housings, and thus the details of the air film providing features of the bearings 25 and 26 are not shown. The bearings 19 and 20, however, as shown are used in dual and oriented and used in an inventive manner.

The axis of arm 17 may be slightly canted or tilted relative to surface 11, if desired to compensate for deflections due to the weight of the probe when it moves to the outer end of the arm.

Figure 2:
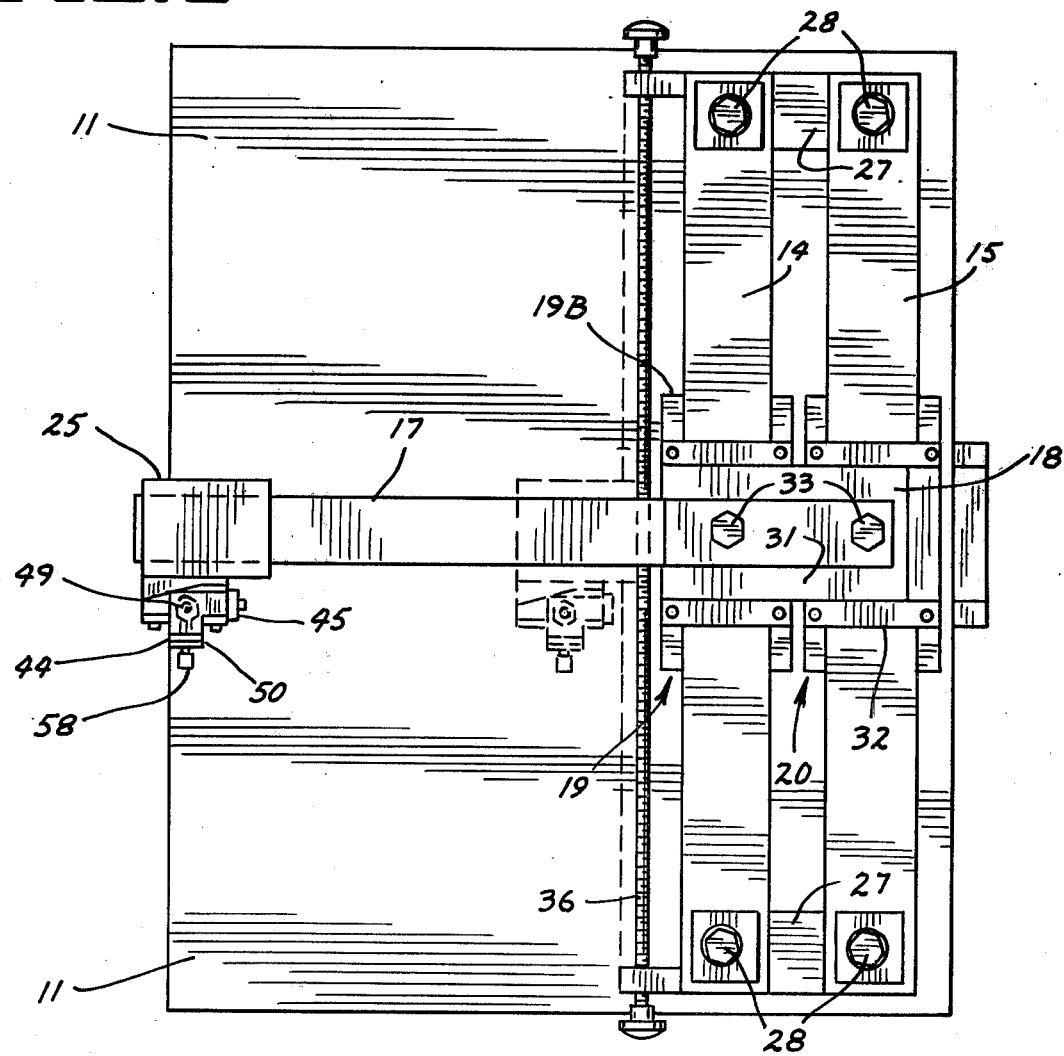
FIG. 2 is a top plan view of the machine of FIG. 1.

In FIGS. 2, 3 and 4, the shields at the ends of the ways 14 and 15 are removed, and referring specifically to FIGS. 2, 3 and 4, it can be seen that the ways are spaced from the table surface 11 by spacers 27. The spacer plates 27 are positioned closely adjacent the ends of the ways and a common spacer plate 27 is used for both of the ways 14 and 15 at each of the opposite ends of the ways.

The spacer plates 27 are also made exactly parallel and are of the desired height to space the lower surfaces of the ways 14 and 15 a desired amount from the surface 11 of the table. Suitable bolts 28 are then passed through the ways from the top, through the spacers 27, and through the table 10 to clamp the ways tightly against the spacers and the table and to hold them securely. It can be seen that each of the ways 14 and 15 is individually supported on a common spacer 27 at each end.

The arm mounting assembly 18 comprises a plate 30 that rests on top of the arm 17, and a granite block 31 that is positioned underneath the arm 17 and on top of a second mounting plate 32. The suitable cap screws or bolts 33, which may be studs mounted into plate 32, are then used to clamp the plate 30, the arm 17, and the block 31 against the plate 32. It should be noted that the block 31 is relieved as at 31A in the center portion, so that the front and rear edges directly above the ways 14 and 15, as perhaps best seen in FIG. 3, are clamped tightly against the plate 32.

The plate 32 in turn is fastened through suitable cap screws or the like to the bearing assemblies indicated generally at 19 and 20. The assemblies 19 and 20 in turn are individually mounted onto the ways 14 and 15, respectively. The bearings are generally similarly constructed except that the bearing assembly 19 includes additional air bearing forming pockets on the bottom surface of the bearing, as will be more fully explained.

Referring now specifically to FIG. 5, the bearing assembly 19 as shown includes an upper plate 19A, front and rear side plates 19B and 19C, respectively and a bottom plate 19D. The top and bottom plates 19A and 19D extend laterally beyond the edges of the way 14 as can be seen, and bolts or cap screws extend through provided apertures in the top plate 19A and through apertures in the side plates 19B and 19C, as generally schematicsally shown in dotted lines at 19E, and these cap screws are threaded into the plate 19D so that the side plates 19B and 19C are clamped tightly against the top and bottom plates 19A and 19D. The four plates then box or surround the granite way 14 with a suitable amount of clearance. An air film is provided between the inner surfaces of these plates 19A, 19B, 19C and 19D and the respective adjacent surfaces of the way 14.

As shown, the surfaces of the plates forming the bearing 19 are provided with small recesses or pads 19F at suitable places, and all of these recesses are connected with suitable interconnecting passageways or fluid conduits 19G. The conduits 19G are in turn connected to the recesses through orifices which are shown schematically to be much larger than they actually are for sake of clarity. All the orifices generally are in the range of 0.010 inch. A suitable source of air pressure 35 is connected through a suitable conduit to the conduits 19G, and thus air under pressure is emitted from the pads or recesses 19F to form a film of air comprising a bearing between the plates and the way 14. The air will be exhausted out through the ends of the bearing assembly, generally as indicated by arrows in FIG. 1.

Additionally, as will be seen in FIG. 5 (and FIG. 9), the plate 19D has recesses or pockets 19H on the lower surface thereof spaced at desirable intervals, and these recesses are also open to the conduits 19G through suitable orifices. When air under pressure from source 35 is supplied, air will also then form a thin bearing film underneath the plate 19D and between plate 19D and the upper surface 11 of the granite table 10. This film will form an air bearing support between the lower surface of the bearing assembly 19 and the table to provide a known spacing and relatively stiff support for the bearing.

The bearing assembly 20 which is also shown in FIG. 5 include plates 20A, 20B, 20C and 20D. The plate 20A is the upper plate, plates 20B and 20C are the side plates, and plate 20D is the bottom plate. Suitable recesses 20F are also formed on the surfaces of these plates adjacent to the way 15, and conduits 20G are used for carrying air under pressure from source 35 which is also shown schematically to these recesses through the conduits 20G and desired orifices which control the flow of fluid to the respective recesses. It should be noted that the plate 20D does not have any air bearing formed between its bottom surface and the table surface 11. An air film bearing is formed only between all the side surfaces of the way 15 and the inner surfaces of the bearing assembly 20.

The plate 32 is attached to both of the plates 19A and 20A, so that plate 32 spans the two bearings 19 and 20 and connects them together in a fixed assembly for supporting the arm 17. Cap screws for holding the plate 32 in place relative to these plates 19A and 20A are shown in dotted lines in FIG. 5 as well.

The conduits 19G and 20G as shown are fluidly interconnected between the top, bottom and side plates forming the respective bearings. The ports formed at the edges of mating plate are aligned, and when the plates are clamped together to form the housing members surrounding the respective way 14 or 15, fluid may flow across this junction between the plates. The passageways or conduits 19G and 20G are drilled holes formed in the plates during manufacture.

The arm assembly 17 can be moved along the ways in the X axis direction (along the longitudinal axis of the ways) manually, or through motor controls, and a fine adjustment screw indicated generally at 36 can be utilized through a bracket 37. The bracket 37 has means for clamping the bracket to the screw, or permitting the bracket to be released so that it does not engage the screw and the arm can then slide along the ways without turning the screw 36. The means to obtain motion along the ways is well known. An electro-optical readout device of suitable conventional design or other encoder of known design can be utilized for determining the movement of the bearing assemblies and the arm along the ways from a reference position. Briefly such an electro-optical encoding device can comprise a transparent scale having a plurality of darkened divisions or non-light transmitting divisions evenly spaced along the length thereof, and a photoelectric coupler comprising a light emitting diode and a light sensitive transistor on opposite sides of the scale so that each time the light source and the light sensor are moved past a darkened strip, an electrical pulse will be delivered. This type of encoding is well known in the art as well, and is available from Bausch & Lomb Incorporated, Rochester, N.Y. By using an electro-optical coupler, digital pulses can be transmitted to encode the movement of the assemblies along any one of the axis utilized.

In FIG. 4, the recesses 19F of the forward plate 19B are shown in dotted lines, and also, the recesses 19H are shown on the bottom plate 19D.

The details of the bearing assembly 25 are not shown, but this is an air supported bearing that permits the probe assembly and its carrying mechanism to move effortlessly along the arm 17, using an air bearing support in a known manner.

The probe support, however, also contains unique features in the form of the invention shown, and permits rotation of the probe about its upright axis during operation while keeping the probe stable. The probe mounting member which was shown schematically at 26 in FIG. 1 includes a support block 40 that is mounted onto the bearing 25, on one side thereof, and moves with the bearing. The block 40 has a vertical axis opening indicated at 41 in dotted lines (FIG. 4) through which a probe shaft (which is tubular) and which is indicated at 42 is slidably mounted for vertical movement on an air film formed by supplying air under pressure to the block 40 and permitting small jets of air to be uniformly discharged around the periphery of the shaft 42.

The shaft 42 has a probe tip 43 mounted at the lower end thereof and the shaft itself is movable up and down in vertical direction. Suitable guides are supplied on the assembly and are supported from block 40, and also as stated previously the shaft 42 and the probe tip 43 are counter-balanced through a pneumatic cylinder assembly by regulated air pressure to provide a sufficient amount of lifting force to counterbalance the weight of the probe and tip. As can be seen in FIGS. 3 and 4, the block 40 supports a first slotted upright guide and support column or member 44 on the side of block 40 opposite from the arm 17. The lower end of the guide and support column or member 44 is fixed relative to support block 40.

It can be seen also in FIGS. 4 and 6 that the upper portion of the shaft 42 is mounted in a mounting assembly 39, and the mounting assembly 39 includes a mounting block 46, a cylinder support member 47 attached to the upper portions of the mounting block 46, and a cylinder 48 that is connected to the cylinder support member 47. The cylinder 48 is a fluid pressure cylinder that has an internal piston and piston rod 49, and the rod in turn is attached to a support plate 50 that is supported to the upright member 44 and to an upright member 45 at the rear of the unit as seen in FIG. 4. The member 50 thus is fixedly supported above the block 40, and does not move relative to the block 40 as the shaft 42 moves up and down. The position of the probe shaft 42 in its downward direction can be stopped through an adjustable stop assembly indicated generally at 51 on the support 44, which may be positioned at a desired location vertically, and which will stop downward movement of the probe assembly.

Referring now specifically to FIGS. 6 and 7, the mounting assembly 39 is shown as including the mounting or support block 46, which is broken away in FIG. 6, and as can be seen the tubular shaft 42 is mounted in the mounting block 46 but is held from movement axially relative to the mounting block 46 through a pair of snap rings, 52 at the top of the mounting block and 53 at the lower surface of the block, so that the tubular shaft 42 cannot move axially. Suitable thrust washers can be placed between the snap rings 52 and 53 and the respective surfaces of the mounting block 46.

The support 47 is an inverted U shaped support having a pair of legs at opposite diagonal corners of the block 46, as can be seen at 47A and 47B in FIG. 7, and a cross member 47C that spans over the top of the probe shaft 42. The cross member forms a support for the cylinder 48. The cylinder 48 has a collar 48A thereon which is clamped up against the cross member 47C through the use of a nut 48B that threads onto the outside of the cylinder. The rod 49 of the cylinder assembly as shown is fastened with respect to the support 50 through the use of a pair of nuts 49A and 49B, and as shown where broken away in the lower portions of FIG. 6, the cylinder 48 has a piston 49C mounted on the interior thereof. The rod 49 is connected to the piston 49C. An air pressure source 54 is connected through a manually adjustable regulator 54A which is physically mounted on the block 40 for easy access by an operator. The regulator is used to control the pressure on the upper side of the piston 49C, and thus it can be seen that the connection of the cylinder 48 to the bracket 47, which in turn is connected to the block 46 and through the snap rings to the shaft 42, provides a counterbalancing upward force tending to lift the cylinder 48 and the connected shaft 42 upwardly when the pressure from regulator 54A exceeds a desired amount. By adjusting the pressure in cylinder 48 the amount of counterbalancing force can easily be regulated.

The support column or member 45 is provided with an uprightly extending groove or recess 45A which receives the outer race of a ball bearing 55, that is mounted on a shaft 56, which in turn is mounted in the mounting block 46. The bearing 55 guides the entire assembly including the shaft 42 and the mounting block 46 as the probe is moved up and down, to provide a stable guide and hold the block 46 properly oriented.

The rotation of the shaft 42 with respect to the mounting block 46 is permitted or prevented by a shaft lock screw 58 that passes through the slot 44A in the support column or member 44, and is threadably mounted through the side wall of the block 46 as at 58A, and which has an end that will bear against the side of the shaft 42 as shown in FIG. 6.

The lock assembly 51, as shown in FIG. 8 is merely a two part member that slides in the slot 44A, and can be clamped relative to the support column 44. This is done with a shouldered clamping screw 51A that passes rotatably through a first guide member 51B and is threaded into a second guide member 51C on the opposite side of the support column 44 from member 51B. The two members 51B and 51C may be clamped tightly against the support column 44 by turning the screw 51A. The member 51C as shown in FIG. 6 has a lug that protrudes out to intercept downward movement of the block 46 mounting the shaft 42.

Loosening the screw 58 permits the shaft 42 to be rotated about its longitudinal or upright axis in block 46. The shaft 42 is carried by the snap rings 52 and 53 without permitting axial movement of the shaft relative to the block or collar 46. The encoding assembly for the Z axis movement is sensitive to movement of the member 46, and a schematic showing of a typical sensor in section is shown in FIG. 7. A glass or transparent scale (ruler-like) 60 extends uprightly parallel to member 45 and has an edge portion that protrudes between bifurcated legs of a mounting member 61. The member 61 carries a light sensitive semiconductor 62 on one leg and a light emitting diode 63 on the other leg. By having horizontal spaced narrow opaque strips on the surface of the transparent member 60, a pulse can be produced each time an opaque strip passes between the light emitting diode 63 and the light sensing member 62. The bifurcated member 61 can be mounted on the mounting block 46, so that it moves vertically with the block and probe, and moves relative to the scale 60. The scale 60 can be mounted on the member 45 if desired. A similar position encoding assembly can be used with each of the bearing assemblies for determining the position of the probe in each of the three axes being sensed.

In summary the cantilevered arm 17 is very rigidly supported by two ways that are positioned in a dual fore and aft position, and which have parallel axes extending along one of the measurement axes of the coordinate machine. The bearing member carrying the arm is supported relative to both of the ways, and at the surface of the bearing that is under the way adjacent the projecting end of the cantilevered arm, an air bearing film is provided relative to the table surface to provide an additional rigid support to hold the arm in a definite relationship to the reference surface.

Additionally, the shaft 42 has the concentrically mounted internal counterbalancing cylinder 48 which counterbalanced the weight of the probe shaft and permits the shaft to be mounted for rotation about its upright axes while counterbalancing. This further eliminates any tendency to bind or drag which can occur if a counterbalancing cylinder that is offset from the axis of the probe is utilized.

Precise operation, and a very rigid assembly is achieved.

What is claimed is:

1. A support for a probe of a coordinate machine, including a first mounting member, means mounting said first mounting member for movement along a first axis, and a probe assembly including a shaft having a longitudinal axis and being axially slidably mounted with respect to said first mounting member in a direction along the longitudinal axis of said shaft, said shaft further being rotatable with respect to said first mounting member, a shaft mounting block, said shaft being rotatably mounted in said shaft mounting block and restrained from axial movement relative to said shaft mounting block, support means for said mounting block mounted fixedly with respect to said first mounting member and having a portion positioned spaced from the first mounting member and including means to slidably guide said mounting block for nonrotational sliding movement as the shaft is moved relative to the first mounting member, and means to releasably lock said shaft relative to said mounting block.

2. The combination of claim 1 wherein said shaft is tubular and has located in its interior a fluid pressure cylinder assembly having two relatively movable members actuable under fluid pressure, one of said relatively movable members being connected to said support means, and means connecting the other of said relatively movable members to said mounting block, and means to supply fluid pressure to said cylinder to tend to counterbalance the weight of said mounting block and said shaft.

3. The combination as specified in claim 1 wherein said support means and means to slidably guide include a pair of upright columns, a first of said columns having a guideway defined therein along the longitudinal axis thereof, and parallel to the axis of said shaft, and a guide roller means mounted in said guideway and attached to said mounting block to prevent rotation of said mounting block relative to said support means.

4. The combination as specified in claim 3 wherein the second of said columns includes a longitudinally extending slot, said means to releasably lock said shaft from rotation relative to said mounting block comprising a screw threaded into said mounting block and passing through said slot, said screw being tightenable against portions of said shaft within said block.

5. The combination as specified in claim 4 and an adjustable stop means mounted in said slot and having a portion protruding into the normal path of movement of said mounting block in a downward direction, said stop means being adjustable along the length of said slot.

6. The combination as specified in claim 1 wherein said means mounting said first mounting member includes a cantilevered arm, said first mounting member being mounted for movement along said arm in direction along the longitudinal axis thereof, and means mounting said arm for movement in a direction axis perpendicular to the longitudinal axis of said arm and perpendicular to the axis of said shaft, said means mounting said arm comprising a pair of parallel spaced ways, separate bearing means on each of said ways, and means to connect said arm to both of said separate bearing means.

7. The combination as specified in claim 6 wherein said ways are mounted onto a table having a reference surface, and means to form an air film bearing between said reference surface and the separate bearing means on the way closest to said probe.

8. In a coordinate measuring machine having a support table with a reference surface and a support arm with a longitudinal axis, the improvement comprising means adjacent one end of said support arm mounting said support arm for movement thereof relative to said table along one coordinate axis, said means mounting said support arm comprising a pair of parallel ways spaced apart in the direction of the longitudinal axis of said arm but being adjacent, and being connected to and spaced above said table, said ways being positioned to provide a substantial work area to one side of said ways, and bearing means connected to said arm and supporting said arm on both of said ways to permit movement of said arm along the ways while being supported by both of said ways, said arm being cantilevered from said ways over said work area, said bearing means each comprising an air bearing relative to the ways, the bearing means for the way adjacent said work area including a plate generally parallel to and spaced from the reference surface, and means to provide an air film support between said plate and the reference surface.

9. In a coordinate measuring machine including means providing a reference planar support surface and having a support arm with a longitudinal axis, the improvement comprising means mounting said support arm for movement thereof along one coordinate axis adjacent one end of said arm, said means mounting comprising a pair of parallel ways fixedly mounted with respect to said means providing a reference support surface and being spaced apart in the direction of the longitudinal axis of said arm and a first of said ways having portions overlying and spaced from said reference support surface, and bearing means acting between both of said ways and said arm to permit movement of said arm along the ways while being supported by both of said ways, said arm having an outer end cantilevered over the reference support surface and extending from said first way, said bearing means including a plate positioned between said portions of said first way and said reference support surface, said plate having a plate surface parallel to and facing said reference support surface, and means to form an air film bearing between said plate surface and said reference support surface.

10. The combination as specified in claim 9 wherein said bearing means comprises a pair of individual bearings, one on each of said ways, and means coupling said bearings together to move as a unit along the ways.

11. The combination as specified in claim 10 wherein said bearing means comprises air bearing support means on each of said ways, said air bearing support means providing an air film between each of said individual bearings and said ways.

12. In a coordinate measuring machine including a table having a reference planar support surface and a probe support arm with a longitudinal axis, the improvement comprising means mounting said probe support arm adjacent one end of said probe support arm for movement thereof along one coordinate axis which is substantially parallel to said reference support surface, said means mounting comprising way means for supporting said probe support arm in position with portions of said probe support arm cantilevered over said reference support surface, said way means having a support surface, and air bearing means mounted on said probe support arm and supporting said probe support arm relative to the support surface of said way means to permit movement of said probe support arm along said way means and to permit movement relative to said reference support surface, said air bearing means including a bearing portion overlying a part of said reference support surface, said bearing portion facing said reference support surface of said table, and means to form an air film bearing between said bearing portion and said reference support surface to provide a support for said probe support arm relative to the reference support surface in addition to the surface of said way means.

13. The combination as specified in claim 12 wherein said way means includes an elongated way member supported in position spaced above said table and said support surface of said way means comprising an outer peripheral surface, and said air bearing means including a bearing member encircling the peripheral surface of said way member and providing an air film bearing around the periphery of said way member.

14. A support for a probe of a coordinate measuring machine including a first mounting member, means mounting said first mounting member for movement along a first axis, and a probe assembly including a tubular shaft member having a longitudinal axis, second means mounting said tubular shaft member relative to said first mounting member to permit sliding movement of said tubular shaft member in opposite directions along its longitudinal axis, a probe portion mounted at the lower end of said tubular shaft member, means to counterbalance said probe portion and said tubular shaft member comprising fluid pressure cylinder means positioned on the interior of said tubular shaft member, said cylinder means having a cylinder member and actuable rod member, means to support one of said cylinder and rod members fixedly with respect to said second means comprising an upright member, a mounting portion supported by said upright member and overlying the tubular shaft member and permitting the tubular shaft member to be moved relative to the mounting portion to a fully raised position during operation, means to support the other of said cylinder and rod members relative to said tubular shaft member, means to provide a desired fluid pressure to said cylinder to tend to counter-balance the weight of said probe assembly, said upright member having a slot extending in direction along the longitudinal axis of said tubular shaft member, and adjustable stop means mounted in said slot to provide a stop to limit movement of said shaft member.

15. The combination as specified in claim 14 wherein said second means mounting said shaft includes a shaft mounting member and wherein said tubular shaft is of circular cross section and is rotatably mounted about its longitudinal axis in said shaft mounting member, means to prevent movement of said tubular shaft in direction along the longitudinal axis of said tubular shaft relative to said shaft mounting member while permitting rotational movement of said tubular shaft relative to the shaft mounting member, and lock means to releasably lock said tubular shaft from rotation relative to said shaft mounting member.

16. The combination as specified in claim 14 wherein said second means includes a mounting collar on the upper end and an inverted U shaped support member mounted to said shaft mounting member, said cylinder member being mounted to said inverted U shaped support member and thereby movable with the shaft mounting member and tubular shaft, said rod member being mounted fixedly with respect to said second mounting means so that upon movement of said tubular shaft in a direction along its axis relative to said second mounting means, said rod and cylinder members move relative to each other, and means to control said desired fluid pressure acting on said cylinder member and rod member to lift the tubular shaft member to provide a counterbalancing force at a desired level.

* * * * *